United States Patent Office 2,780,663
Patented Feb. 5, 1957

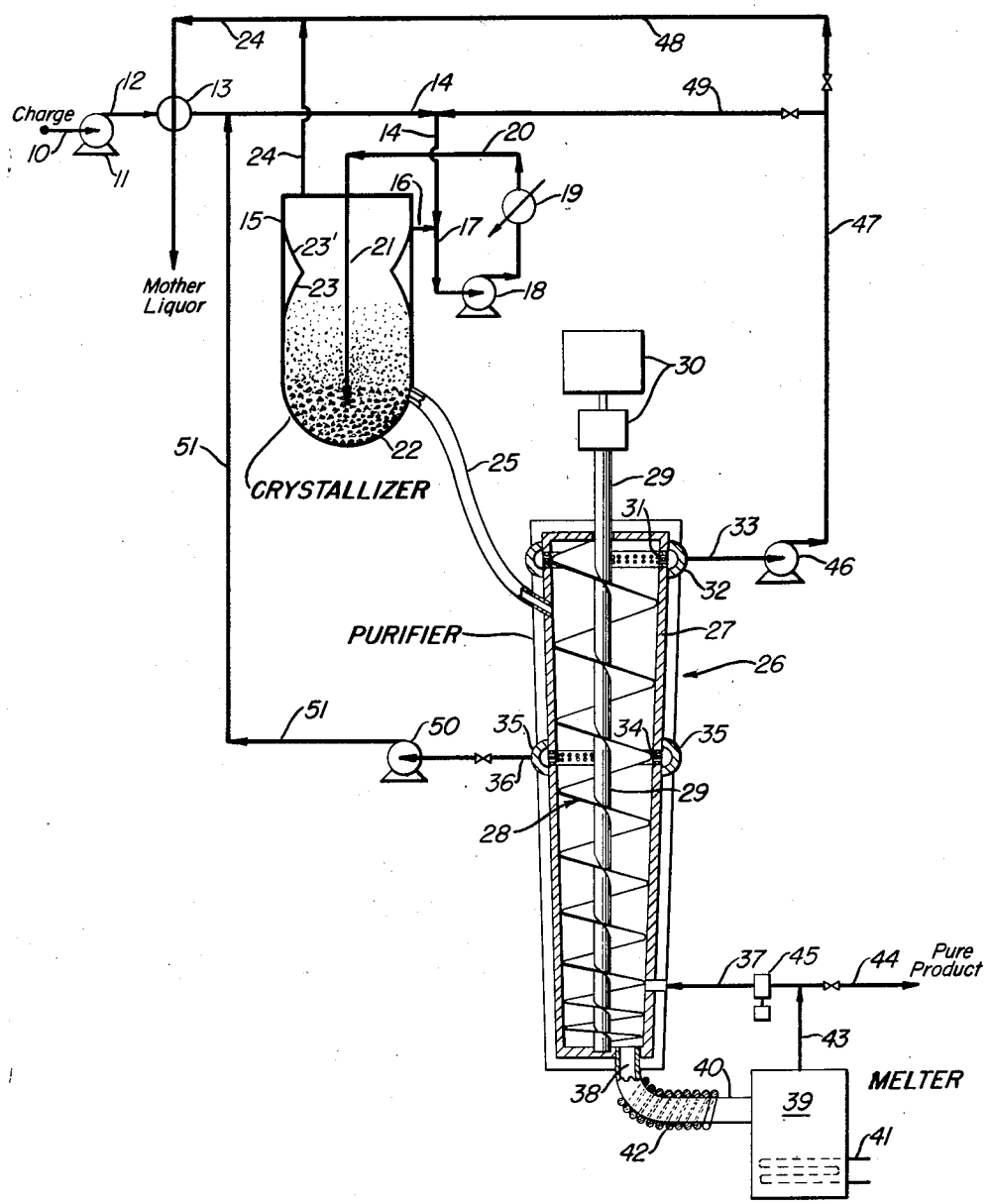

2,780,663

FRACTIONAL CRYSTALLIZATION AND CRYSTAL WASHING

Robert C. Gunness, Flossmoor, Ill., assignor to Standard Oil Company, Chicago, Ill., a corporation of Indiana Application May 29, 1953, Serial No. 358,267

6 Claims. (Cl. 260—674)

This invention relates to fractional crystallization and it pertains more particularly to an improved method and means for purifying crystals contaminated with a mother liquor. Specifically the invention is applicable to obtaining paraxylene of high purity from a narrow boiling range xylene fraction containing other xylene isomers and small amounts of ethyl benzene and/or non-aromatic hydrocarbons.

When paraxylene is fractionally crystallized from a mixed xylene concentrate, the resulting crystals must be separated from mother liquor. Heretofore such crystals have been centrifuged and washed by various procedures all of which involve substantial investment costs and which fail to produce paraxylene of high purity without substantial sacrifices in yield. An object of this invention is to provide a relatively simple and inexpensive system for purifying paraxylene. A further object is to provide a system which will produce paraxylenes in larger yields and/or of higher purity than heretofore obtainable. Other objects will be apparent as the detailed description of the invention proceeds.

In accordance with this invention a crude liquid (e. g. a xylene concentrate) containing a component (e. g. paraxylene) which can be selectively crystallized therefrom is cooled to such temperature and under such conditions that said component is crystallized without crystallizing appreciable amounts of any other components. For best results large crystals should be produced and the initial crystallizing or freezing step is preferably conducted in a manner to promote crystal growth and segregation so that a slurry of large crystals can be introduced into the purification system.

The purification system comprises a vertical circular vessel which may be either cylindrical or conical provided with a compression screw of gradually decreasing pitch toward the bottom or crystal outlet of the vessel, said compression screw being mounted on a driven shaft. The periphery of the compression screw is adjacent the inner vessel wall so that it effectively scrapes the surface thereof. Adjacent the top of the wall the vessel is perforated and/or provided with a filter element which enables the discharge of liquid through an outlet conduit while preventing the escape of crystals, said perforated portion or filter element of the vessel being continuously scraped clean by the wiping action of the upper convolution or convolutions of the compressive screw. The concentrated crystal slurry is introduced into the vessel at a rate and under such pressure as to provide a substantially compact mass of crystals which by the rotation of the screw is compressed while it is being conveyed downwardly to the discharge end of the vessel which may be a single opening of small diameter as compared to that of the vessel or a grid or perforated baffle which cooperates with the rotating compressive screw to squeeze the crystals into a relatively solid plug which is constantly being deformed and forced through the relatively small discharge opening.

The discharge opening or openings communicate directly or through one or more conduits to a crystal melting chamber which may be directly or indirectly heated so that the crystals are melted either in the chamber or in a conduit communicating with the chamber. The chamber is designed to withstand high pressure and the withdrawal of liquid from the melting chamber is controlled so that a part of the melted crystals flows back through at least a portion of the compressed crystal mass to effect countercurrent washing of the crystals whereby mother liquor originally surrounding the crystals is replaced by pure product liquid. Although the countercurrent flow of melted crystals may be through the discharge opening or openings at the base of the purification vessel, this may require the use of undesirably high pressures in the melting chamber in view of the extremely small void space and large resistance to flow in the mass leaving the base of the vessel. The melted liquid is, therefore, preferably returned in controlled amounts by means of a pump to the vessel at a level spaced from the bottom discharge end thereof where void space in the crystal mass is somewhat larger and resistance to flow is consequently smaller. The amount of melted crystal liquid which is returned to the vessel must slightly exceed the total void (liquid-occupied) space in that portion of the vessel into which it is introduced so that the melted pure product liquid can effectively displace mother liquor which in a manner analogous to reflux action in distillation prevents mother liquor from reaching the crystal outlet without having excessive amounts of the melted product carried to the top of the purification vessel. Thus while a small amount of countercurrent washing may be effected in the base of the purification vessel the major effect is a replacement of mother liquor by pure melted product in the lower portion of said vessel.

In order to maximize yields of extremely high purity products the amount of melted product returned from the melting chamber may substantially exceed that required for replacing all liquid in that portion of the tower and may not only effect a countercurrent washing but a partial solution of crystallized material. In this embodiment of the invention liquid is preferably withdrawn from an intermediate level of the purification vessel through perforations and/or a filter element which is continuously wiped by the compressive screw convolutions and the liquid withdrawn from the intermediate level is returned to the crystallizing step.

The invention will be more clearly understood from the following detailed description read in conjunction with the accompanying drawing which forms a part of the specification and which is a schematic flow diagram of the crystallization, purification and melting system.

As an example the invention will be described as applied to a process for obtaining substantially pure paraxylene from a crude xylene concentrate obtained in a conventional naphtha hydroforming operation, said concentrate containing by volume about 17 percent ortho-xylene, 33 percent meta-xylene, 12 percent paraxylene, 24 percent ethylbenzene, 10 percent non-aromatics and 2 to 3 percent $C_7$ and $C_9$ aromatics. Such concentrate is first dried if it contains appreciable amounts of moisture. It is then passed from source 10 by pump 11 through line 12 to precooler 13 wherein it is cooled by heat exchange with mother liquor to a temperature in the range of about —50 to —75° F., e. g. about —60° F., the precooling temperature being high enough to avoid crystal deposition in the precooler. The precooled liquid is then passed by line 14 for admixture with a relatively large volume of cold liquid which is withdrawn from the upper part of crystallizer 15 through line 16, the combined liquids being passed through line 17 by circulating pump 18 through cooler 19 and thence through line 20 to line 21 of the crystallizer. The crystallizer is preferably operated at a temperature in the range of about −120 to 130° F., e. g. about −125° F. and the stream withdrawn through line 16 is preferably about 50 to 150 volumes for each volume of incoming charge through line 14. The cooler or refrigeration system 19 is operated with a ΔT between refrigerant and circulating liquid which is below about 10° F. and preferably below 5° F., the recycled liquid flowing through the cooler with such velocity as to avoid crystal deposition on heat exchange surfaces.

The bottom 22 of the crystallizer 15, which is preferably of the Oslo-type is rounded or hemispherical so that the discharge of cold fluids from the downwardly extending end of conduit 21 tends to sweep the crystals upward while supplying necessary refrigeration for effecting paraxylene crystallization and crystal growth. Thus a classification of crystals is obtained with the larger crystals near the bottom, the smaller crystals in the intermediate zone and susbtantially no crystals in the top of the crystallizer. A curved annular deflecting baffle 23 helps to limit the circulation of liquid to the lower part of the crystallizer while adjacent downwardly sloping annular baffle 23 allows for return of settled crystals from the upper quiescent zone to the lower classification zone. Mother liquor is withdrawn from the upper part of crystallizer 15 through line 24 and employed as a refrigerant in precooler 13.

A concentrated slurry is withdrawn from the lower part of crystallizer 15 through line 25 to purifier 26. The purifier is a closed steel vessel 27 which is circular in cross section and which may be cylindrical or gradually tapered so that its base is of lesser diameter than its top. A compressive helical screw 28 is mounted for rotation in vessel 27 so that the periphery of the screw wipes the inner wall of the vessel and conveys solids toward the base of the vessel, said screw being mounted on shaft 29 which is driven by any suitable motor and gear reducing means 30. A screw of uniform pitch may be employed if the vessel is sufficiently tapered to provide gradually increasing compression on the solids as they are moved from the upper to the lower part of the vessel. Preferably, however, the pitch of the compressive screw gradually decreases from top to bottom and is of the type, for example, described in U. S. 1,553,539. At the upper part of the vessel slots or perforations 31 are provided to permit withdrawal of liquid into an annular collector 32 from which said liquid may be withdrawn through line 33. The perforations should be small enough to prevent loss of paraxylene crystals, i. e. less than about 1 millimeter in diameter. Alternatively a filter element may be inserted in the wall at this point so that its inner surface is flush with the inner wall of the vessel. A similar perforated section 34 may be provided at an intermediate elevation in the vessel with annular liquid collecting means 35 discharging into line 36. At a level at least about 2 or 3 screw flights from the bottom of the vessel, a communication is provided for inlet line 37. At the base of the vessel there is one or more small outlet ports 38 communicating with a melting chamber 39 either directly or through one or more conduits 40. Instead of employing a single small outlet 38 in conduit 40 as shown in the drawing, the base of the purifier may be in the form of a perforated grid immediately above the melting chamber so that the base of the purifier forms the top of the melting chamber.

The melting chamber is provided with any conventional heating means 41 and/or the melting may be effected by heating means 42 surrounding the conduit 40. Melted liquid from vessel 30 and/or conduit 40 may be made to flow upwardly through opening 38 into vessel 27 if sufficiently high pressure is maintained in the melting chamber but better control is attained if the melted liquid is withdrawn from chamber 39 through line 43, the net amount of melted product is withdrawn through line 44 and a controlled amount of total melted product is returned by pump 45 through line 37 to the lower part of vessel 27. The return of melted product at a level spaced from the base of vessel 26 enables the retention of a substantially impervious plug at the crystal outlet of the purifier even though amounts of returned liquid vary to a considerable extent.

In operation, a slurry of about 20 percent paraxylene crystals and 80 percent mother liquor is introduced through line 25 to vessel 27 until the vessel is substantially filled with solid paraxylene crystals, the mother liquor being withdrawn through perforations or filter elements 31 and line 33. If the pressure in the crystallizing system is not adequate to force mother liquor through filter 31 a pump may be employed in line 25 to supply the necessary pressure. Vessel 27 should, of course, be insulated or even cooled if necessary to prevent undue temperature rise therein. Compressive screw 28 is continuously rotated at constant speed, usually about 5 to 50 R. P. M. depending on the diameter of the vessel in order not only to convey the crystals toward the bottom of the vessel but to subject the crystals to gradually increasing compression or squeezing so that the void (liquid) space between the crystals becomes smaller and smaller as the crystal mass moves downwardly. At the top of the tower the bulk of the space may be occupied by liquid, i. e. the void space may be about 80 percent. The avoid space is gradually reduced as the crystal mass is moved downwardly so that at the base of the tower it may be of the order of about 10 to 30 percent depending upon the size distribution of the crystals. However, at the bottom of the vessel the crystals are compressed sufficiently to form a plug which is highly resistant to fluid flow and from which most of the surrounding liquid has been squeezed out.

The extruded crystal mass is melted in chamber 39 and/or conduit 40 and valve 45 is controlled to insure the return to the vessel by line 37 of at least about 20 percent of the total melt discharged through line 43. The amount of pure product melt returned through line 37 should be sufficient to displace all mother liquor surrounding the crystals in this portion of the vessel and to effect a countercurrent washing of crystals in that portion of the vessel immediately above the inlet of line 37. That portion of the returned liquid which moves upwardly to higher levels in the vessel encounters crystals that are at a temperature below the freezing point of pure paraxylene so that a substantial amount of the paraxylene solidifies on these crystals and is returned to the base of the vessel (somewhat analogous to reflux action in distillation processes).

Although a paraxylene of high purity can be obtained by returning only about 20 to 30 percent of melted product discharged through line 43, even higher product purity is obtainable by increasing the amount of pure product returned through line 37. When the amount of pure product returned through line 37 is so small that a negligible amount of it reaches the top of vessel 27 the mother liquor withdrawn through 33 is passed by pump 46 and lines 47 and 48 to line 24 for discharge with mother liquor withdrawn from the crystallizer. However, if appreciable amounts of pure product reach the top of vessel 27 the liquid from line 47 may be passed through line 49 to line 14 for return to the cooling and crystallization system. It is preferred to discharge the filtrate from line 33 with mother liquor and if the volume of melted product returned through line 37 is large, i. e. of the order of 30 to 50 percent or more of total liquid withdrawn through line 43, this wash liquid may be withdrawn through filter 34 and line 36 and be returned by pump 50 in line 51 to line 14 for return to the refrigeration and crystallization system. This latter method of operation substantially avoids losses in ultimate paraxylene yield and enables the production of substantially pure paraxylene.

While the invention has been described as applied to a preferred example, it should be understood that said example is by way of illustration and not by way of limitation. The invention is applicable to other liquid charging stocks of which one component may be selectively crystallized and to processes wherein it is desirable to concentrate the mother liquor with minimum loss rather than to obtain crystallized material of high purity. Other methods of crystallization may be employed such as the use of scraped surface exchangers, direct evaporative cooling, etc. Also various modifications and alternative operating procedures and conditions will be apparent from the foregoing description to those skilled in the art.

I claim:

1. The method of obtaining high purity paraxylene from a narrow boiling hydrocarbon fraction which contains a substantial amount of paraxylene and at least one other xylene isomer which method comprises selectively crystallizing paraxylene from the hydrocarbon fraction to obtain a slurry of paraxylene crystals in mother liquor, introducing said slurry at the upper part of a purification zone, filtering mother liquor from crystals at the upper part of said zone, conveying crystal mass from the upper part to the lower part of said zone while subjecting said mass to gradually increasing pressure, introducing sufficient melted paraxylene at the lower part of said zone at a level spaced from the base thereof to remove mother liquor from the surface of said crystals and replace mother liquor from the space between crystals in said lower part of the zone and discharging from the base of said zone a compact mass of paraxylene crystals in which the void space between said crystals is filled with substantially pure paraxylene.

2. The method of obtaining high purity paraxylene from a narrow boiling hydrocarbon fraction which contains a substantial amount of paraxylene and at least one other xylene isomer which method comprises selectively crystallizing paraxylene from the hydrocarbon fraction to obtain a slurry of paraxylene crystals in mother liquor, introducing said slurry at the upper part of a purification zone, conveying crystal mass from the upper part to the lower part of said zone while subjecting said mass to gradually increasing pressure, discharging from the base of said zone a compact mass of paraxylene crystals in which the void space between said crystals is filled with substantially pure paraxylene, melting crystals of paraxylene discharged from the base of the purification zone and returning a portion of the melted paraxylene to the purification zone at a level spaced from the bottom of said zone whereby a substantially impervious plug of paraxylene crystals may be maintained below the level of melted paraxylene introduction.

3. Apparatus for obtaining in substantially pure form a component of a liquid mixture which may be selectively crystallized therefrom which apparatus comprises means for selectively crystallizing a component from said solution, a closed vertical vessel of circular cross sectional area, a compressive screw mounted for rotation in said vessel so that the flights of said screw wipe the inner wall of said vessel and convey solids downwardly in said vessel under gradually increasing pressure, a filter element at the upper part of said vessel, a melting chamber communicating with the base of said vessel through at least one conduit of smaller cross sectional area than the base of said vessel, means for melting crystals introduced into said chamber, means for introducing crystal slurry from said crystallizing means to the upper part of said vessel and means including a pump for returning a controlled amount of melted liquid from said melting chamber to the lower part of said vessel at a level spaced from the bottom thereof.

4. The apparatus of claim 3 wherein the crystallizing means includes a crystal slurry concentrator and a conduit for withdrawing mother liquor from said concentrator which also includes a conduit for combining filtrate from the upper part of the purification vessel with said mother liquor.

5. The apparatus of claim 3 which includes a conduit for returning melted crystals to the purification vessel at a level spaced from the bottom thereof.

6. The apparatus of claim 3 which includes a filter element at an intermediate level in said vessel and a conduit for returning filtrate from said intermediate level to said crystallizing means.

References Cited in the file of this patent

UNITED STATES PATENTS

| | | |
|---|---|---|
| 2,317,777 | Krause | Apr. 27, 1943 |
| 2,436,064 | Crosby | Feb. 17, 1948 |
| 2,533,232 | Dressler | Dec. 12, 1950 |
| 2,540,977 | Arnold | Feb. 6, 1951 |
| 2,617,274 | Schmidt | Nov. 11, 1952 |